United States Patent Office 3,353,915
Patented Nov. 21, 1967

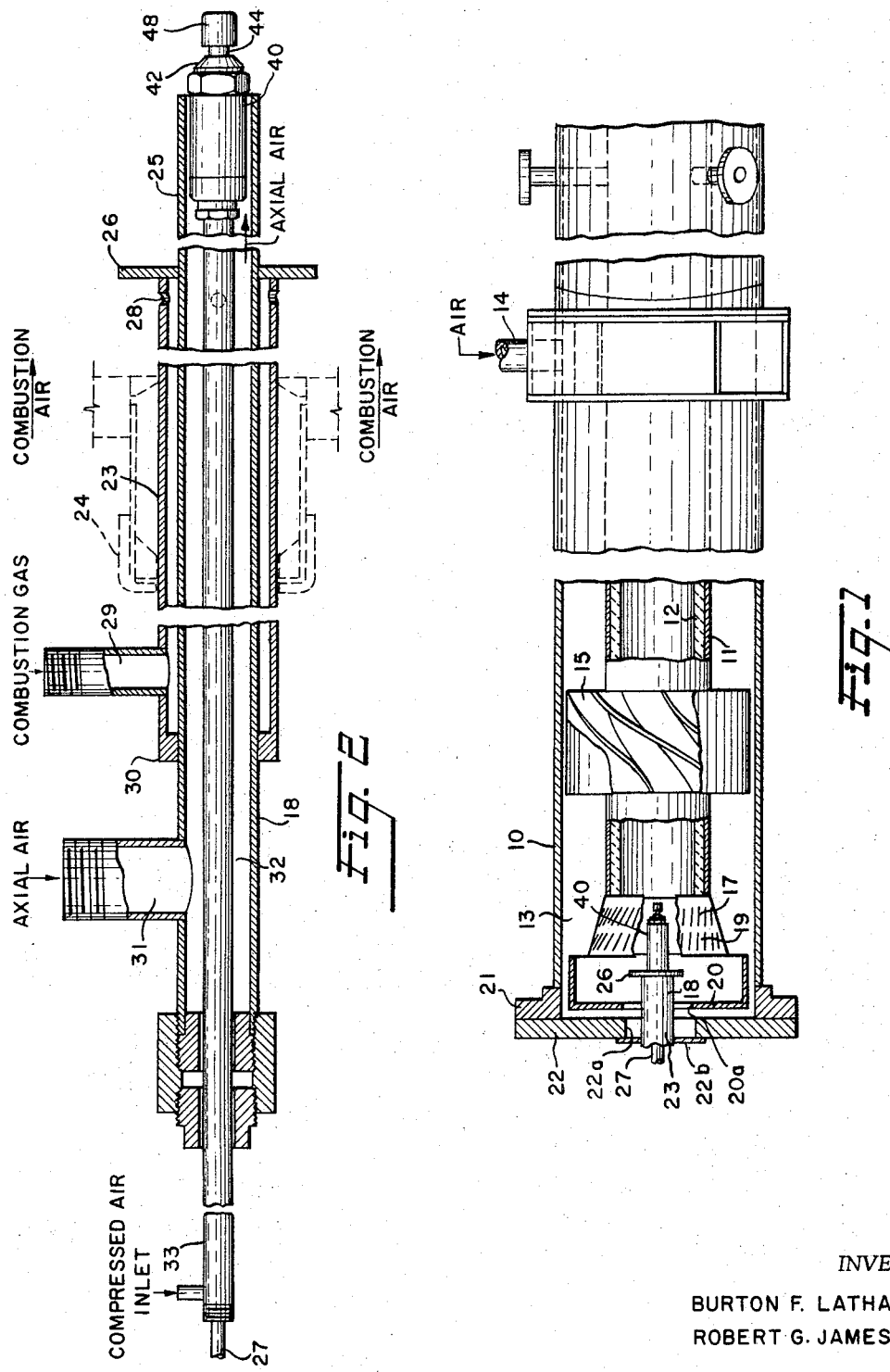

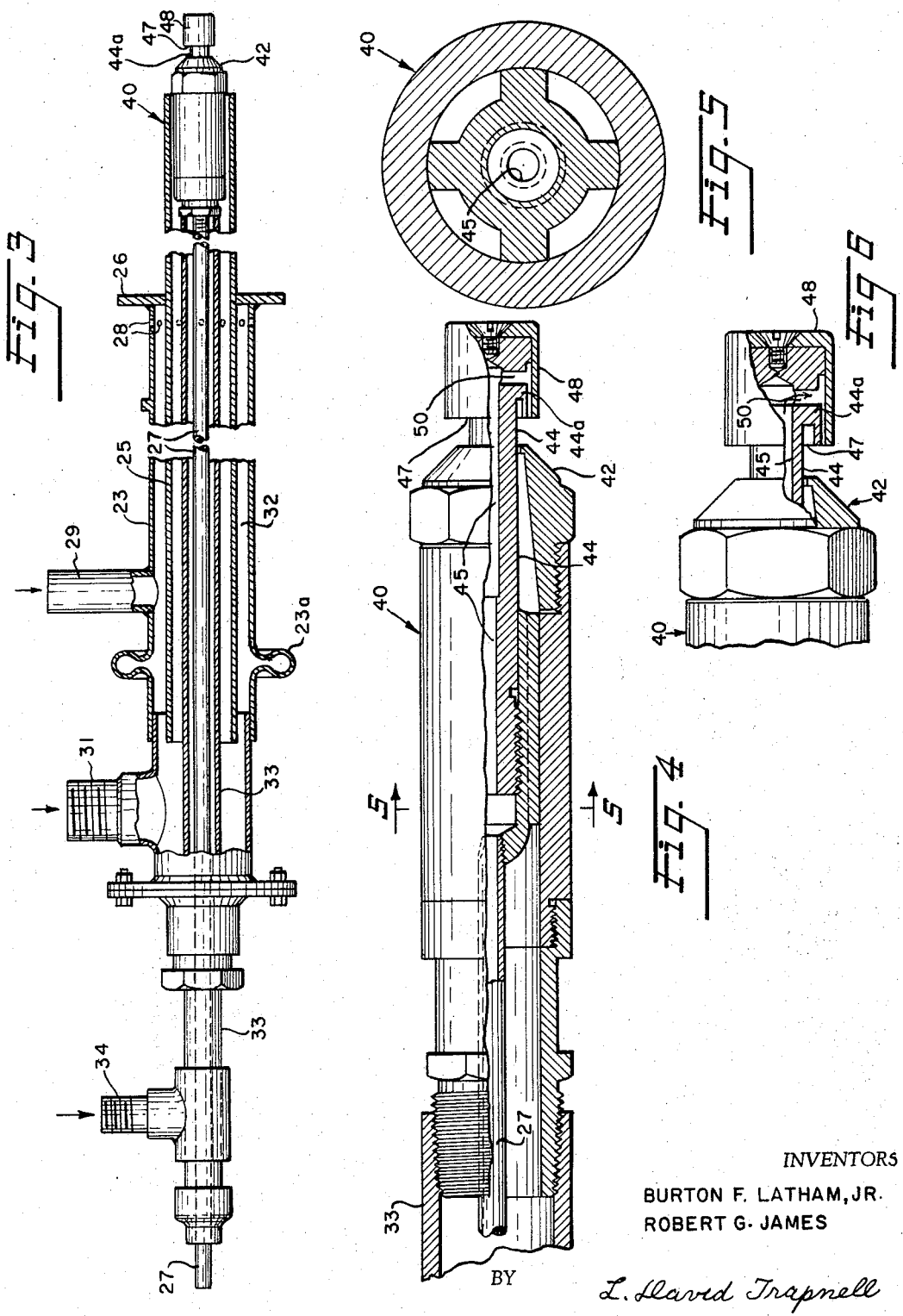

3,353,915
METHOD AND APPARATUS FOR MAKING CARBON BLACK
Burton F. Latham, Jr., and Robert G. James, Houston, Tex., assignors to Continental Carbon Company, Houston, Tex., a corporation of Delaware
Filed Dec. 4, 1964, Ser. No. 415,985
15 Claims. (Cl. 23—209.4)

This invention relates to the production of carbon black by the pyrolysis of petroleum oils or any type of fluid hydrocarbon.

As pointed out in Patent No. 2,976,127 to Burton F. Latham, Jr., one of the present applicants, it is generally known in the art that the carbon black of superior grade and smaller particle size are obtained by high temperature cracking reaction which proceeds to its conclusion in the shortest possible time; and that the high temperature is attained by complete combustion of a fuel gas and the injection of hydrocarbon mist or vapor directly into the hot products of combustion. The admission of excess air into the combustion process is usually practiced in order to obtain additional heat from partial combustion of the oil. It is also equally well known that rapid mixing of the hydrocarbon mist or vapor with the hot products of combustion is essential for carbon black of the desired small-particle size.

The present invention involves the making of carbon black in an apparatus which is generally characterized by an elongate cylindrical reactor, or combustion chamber, wherein the combustion air and fuel gas are mixed by turbulence, the air-gas mixture ignited, and the hydrocarbon (in mist or vapor form) introduced to the flame, such an apparatus being of the general type of that of the aforementioned Patent No. 2,976,127 as well as of Patent No. 3,087,796 to Burton F. Latham, Jr., and Theodore A. Ruble.

It is among the objects of the present invention to provide a method and apparatus for making carbon black of the type described (i.e. furnace black) which produces vastly improved results from all aspects of the operation, as will be set forth more fully hereinafter.

We have discovered that in the manufacture of furnace black tremendously increased yield and production rates may be realized by the utilization of sonic energy in the combustion zone.

More specifically there is obtained (1) much faster combustion of the fuel gas or fuel oil by
 (a) causing a faster and more uniform mixing of the combustion air and the fuel, and (b) direct bombardment of the reacting molecules with the high intensity sound wave;
(2) much finer dispersion of the feedstock hydrocarbon by sonic wave agitation of the same, either in the form of gas or as atomized droplets;
(3) much faster cracking of the feedstock oil to carbon and hydrogen with the sonic wave energy by (a) causing a breakdown of the surface gas films surrounding the oil droplets resulting in a more rapid heat transfer, or rapid diffusion of vaporized hydrocarbon, and (b) direct sonic bombardment of the cracking hydrocarbon molecules;
(4) carbon black or higher tint (i.e., smaller particle size) and higher oil absorption (higher chain structure).

The present invention, then comprises the novel features generally outlined hereinabove which will be fully described with reference to certain illustrative embodiments shown in the accompanying drawings, particularly adapted for use of a liquid feedstock though it is to be understood that the same basic apparatus can be used for a gaseous feedstock, in which FIGURE 1 is a longitudinal fragmentary elevation, partly in section, of a form of carbon black producing apparatus which may satisfactorily be used to practice the teachings of the present invention;

FIGURE 2 is a longitudinal sectional view illustrating the relationship of the means for feeding the feedstock hydrocarbon to the means for feeding the fuel gas and the means for feeding air for supporting combustion;

FIGURE 3 is a longitudinal view, partly in section, illustrating a modification of the showing of FIGURE 2;

FIGURE 4 is a longitudinal view, partly in section, illustrating a sonic spray nozzle which will be more specifically referred to hereinafter;

FIGURE 5 is a sectional view taken on the lines 5—5 of FIGURE 4; and

FIGURE 6 is an enlarged fragmentary view, partly in section, which illustrates further details of the sonic spray nozzle of FIGURES 4 and 5.

Referring more particularly to the drawings, in FIGURE 1 there is generally shown a form of carbon black reactor which has been effectively utilized to practice the teachings of the present invention, the same being generally patterned after that of Latham and Ruble Patent No. 3,087,796.

In FIGURE 1 of the reactor, the numeral 10 designates an elongate metallic housing or shell which comprises the outer jacket of the apparatus in which there is concentrically disposed an elongate metallic tube 11 of lesser diameter, said elongate tube being provided with an inner lining of refractory 12.

The outer housing or shell 10 can take the form of standard 18-inch (inside diameter) steel pipe with the inner elongate tube 11 being from about 10 to 14 inches in inside diameter and also of standard steel composition. The length of the housing can acceptably vary between about 10 and 15 feet and the length of the inner tube can suitably be about 2 to 3 feet less than the length selected for the shell member. The refractory lining 12 is desirably of the minimum thickness capable of protecting the tube 11 for an extended period of time. A 2-inch thick liner of a castable refractory within a 14-inch diameter tube has been successfully employed in an apparatus of the type presently described.

Referring to the left-hand end of FIGURE 1, the adjacent end of the inner elongate tube 11 terminates short of the corresponding end of the outer shell 10 thereby providing a cylindrical chamber 13 substantially unobstructed save for certain appurtenances disposed therein, the function of which will be described hereinafter.

In FIGURE 1, free oxygen containing gas, as for example atmospheric air, enters tangential air inlet 14 at the right-hand end of the outer shell 10 to be circulated in an annular spacing between said shell and the inner tube 11 for the purposes of cooling the tube 11 and concurrently preheating the air. The tangential air inlets 14 can acceptably take the form of a rectangular slot as shown or alternatively can be circular in design. While two tangential air inlets are shown, more than two inlets can be provided and in some instances one of such inlets will suffice.

Disposed towards the left-hand end or upstream end opening of the inner tube 11 are various elements which individually or collectively can be utilized to direct the input air progressing from the tangential air inlet 14 through the annular spacing and ultimately into the aforementioned unobstructed chamber 13. More particularly, these elements can take the form of a section of helically disposed turning vanes 15, or an appropriately louvered metallic frusto-cone 17 with its smaller end suitably connected to the adjacent end of the inner tube 11, as by welding, bolting, etc. As indicated, these elements can be used singularly or in combination as shown in FIGURE 1.

Advantageously, the section of air-turning vanes is mounted within the annular spacing at a location somewhat removed longitudinally from the up-stream end opening of the inner tube 11.

The main body portion of the frusto-cone 17 is provided with a plurality of rows of louvers 19. In FIGURE 1, the louvers 19 are shown as being in a double row and extending obliquely in a scooplike position at right angles with respect to the flow of air impinging thereon.

The foregoing description of combustion air flow is not to be construed as limiting since it is possible to use straight line flow in the annulus between shell 10 and tube 11, either by injecting the air parallel to the reactor axis therethrough rather than tangentially or by using vanes 15 and louvers 19 of a different configuration to straighten any helical flow in said annulus. The air can also be introduced directly into the chamber 13 in the event the same does not need to be used to cool a tube such as 11 or be preheated by such passages.

Within the cylindrical chamber 13, and in axial alignment therewith, is a heat shield 20 which can acceptably be fabricated from 10 gauge, No. 309 stainless steel. This heat shield can suitably resemble a shallow cylindrical pan having a diameter which is intermediate the diameters of the inner tube 11 and the outer shell 10, and preferably approximately corresponding to the diameter of the latter as shown (FIGURE 1). The base of the heat shield 20 is provided with a central aperture 20a; and it is supported in any suitable manner.

The shell 11 is provided at the inlet end of the reactor with a flange 21 to receive cover member 22 having a central aperture 22a to be covered by a burner flange 22b to adjustably and removably position assembly 18 within the reactor.

Referring to FIGURE 2, the burner and hydrocarbon injection assembly generally shown as 18, comprises a tube 23 extending through the cover member 22 substantially axially and rigidly attached thereto by means of a packing gland 24 shown schematically by dotted lines. A tube 25 is disposed concentrically within the tube 23 and extends within the cylindrical chamber 13 beyond the extremity of the tube 23 as shown. A vertically disposed disc 26 serves as a closure member for the annular space formed between tubes 23 and 25 and its primary purpose is to prevent blowout of the flame under operating conditions, the same has a diameter which is substantially greater than the outside diameter of the tube 23 and is rigidly attached to the respective tubes by welding.

Concentrically mounted within the tube 25 is a hydrocarbon feedstock supply pipe 27, the inner end of which connects with the fluid chamber of a sonic spray nozzle to be later described.

Immediately behind the disc 26 is a plurality of radially oriented apertures 28 communicating with annular spacing formed between the tube 23 and the tube 25. The other (and externally projecting) extremity of the tube 23 is provided with an annular closure member 30. Combustion fuel gas is supplied to the apertures 28 through the gas inlet connection 29. Rearwardly or upstream of the annular closure member 30 there is provided an axial air inlet connection 31 through which air is introduced into the annular air chamber 32 formed by the inner surface of tube 25 and outer surface of a pipe 33 which is disposed concentrically of, and between, the pipe 25 and the hydrocarbon supply pipe 27.

For purposes which will be more fully understood as this description proceeds, compressed air is introduced to the pipe 33 which is intermediate the feedstock supply pipe 27 and the pipe 25.

Disposed in, but projecting slightly from, the inner end of the pipe 25 is a sonic spray nozzle, the main body member thereof being generally indicated at 40.

As shown most clearly in FIGURE 4 this body member 40 is hollow and terminates in a choked nozzle 42.

A resonator stem 44 having an axial bore 45 is positioned axially in and projects from the choked nozzle 40. The projecting, or downstream end, of the resonator stem 44 is provided with an enlarged radial flange 44a having on its upstream side an annular groove which forms a resonator cup 47.

A centrally apertured end member or oil discharge cap 48 is carried by the stem 44 at a position which is downstream with respect to the resonator cup 47. This end member or oil discharge cap is provided with a rearwardly extending annular skirt 48a which encloses, but is spaced from the enlarged radial flange 44a, the intermediate space providing an annular oil discharge area.

Radial apertures 50 in the enlarged annular flange 44a communicates with the axial bore 45 of the stem 44.

The inner end of the oil (or feedstock) supply pipe 27 is connected to the axial bore 45 of the stem 44; and it is expelled therefrom into and through the radial apertures or spray orifices 50.

The pipe 33 (which is positioned between the oil supply pipe 27 and the pipe 25) is suitably connected to a source of compressed air and communicates with the space between the interior of the hollow body member 40 of the sonic spray nozzle and the exterior of the hollow stem 44; the compressed air being expelled through the choked nozzle 42.

The sonic spray nozzle shown and described herein is not per se part of the present invention, and a number of sonic spray nozzles of different construction may be employed. However, excellent results have been obtained with an Astrospray Micromist, Model 1814 (as sold by Astrosonics, Incorporated, of Syosset, Long Island, New York), which was modified by making the body of circular cross-section and by centering the oil supply pipe 27 within the compressed air pipe 33, as shown in the drawings and described earlier herein.

The (atmospheric) axial air which enters the air inlet connection 31 flows between the pipes 25 and 33 and through the annular space between the inner surface of the pipe 25 and the hollow body member 40 of the sonic spray nozzle, thus directing oil spray and keeping sonic spray nozzle cool.

The compressed air flowing from the sonic spray nozzle in the manner described is emitted as a supersonic jet stream from the choked nozzle 42 and converted into sonic waves of compression and rarefaction by the cavity resonator 47.

The bevelled surface of the choked nozzle 42 provides a deflecting surface to high velocity sonic waves which are generated by the cavity resonator 47.

The configuration of the surface of the choked nozzle 42 and the cooperating surfaces of the resonator cup 47 are such that a low pressure area is formed adjacent the spray orifices 50. This low pressure draws oil emerging from the spray orifices 50 into the reflected sound field. The high intensity sonic wave action of alternate pressure and rarefaction operating on the air molecules causes turbulence within this field which results in the atomization of the liquid into a micromist.

In the foregoing manner thin streams of oil are fed into the high intensity sonic energy fields. Constant-frequency sound waves within this field (at set frequency and low pressure) provide an effective chopping action thus breaking the liquid stream into an aerosol or mist.

Normally, air at 15 to 60 pounds per square inch may be used to generate sound waves at a frequency of 9400 cycles per second (a high pitched sound to the human ear).

The size of the particles is a function of flow, pressure, orifice size and position of the resonator.

As indicated earlier herein, the general apparatus of FIGURES 1 and 2 is patterned after Patent No. 3,087,796 to Burton F. Latham, Jr., and Theodore A. Ruble, dated April 30, 1963.

The apparatus of FIGURE 3 is similar to that of FIGURES 1 and 2, but departs therefrom in some structural aspects, as will appear immediately hereinafter.

In FIGURE 3, it will be observed that in lieu of the annular closure member 30 at the upstream end of the outer pipe 23, there is a telescopic connection in the pipe 23 between the gas inlet connection 29 and the air inlet connection 31, and a single convolution expansion joint 23a in the body of the pipe 23 spaced slightly downstream with respect to the aforementioned telescopic connection.

As further shown in FIGURE 3, the upstream end of the pipe 33 is capped and provided with a T connection 34 for communication with the source of compressed air; the hydrocarbon oil supply pipe extending through a suitable packing gland in said pipe cap.

It will be understood that the apparatus of the present invention may acceptably utilize a quench section of standard design.

The carbon black produced in the reaction zone after proceeding through the quench section is removed from the effluent gases by means of the usual collecting devices which also are well known in the art.

An experimental unit embodying the teachings of the present invention achieved all of the objectives set forth earlier herein, including increased atomization of the feedstock oil and improved fuel combustion, together with remarkably increased speed of cracking of the feedstock to carbon black; that is, much higher yields and combustion rates.

In the identical reactor apparatus comparative runs were made using a conventional burner assembly and the assembly disclosed herein, said reactor having an increased oil rate of 30 g.p.h. by the sonic use of air in amounts equal to 6000 s.c.f.h. over air used in the conventional burner. This increased oil rate, from 182 g.p.h. to 212 g.p.h., provided the 30 g.p.h. which exceeds the 7.6 g.p.h. gain derivable from the increased air, hence the difference of about 22 g.p.h. represents the effectiveness of the present invention due to use of sonic energy in the manner described.

The present invention, therefore, is well adapted to carry out the objects and attain the ends and advantages mentioned, as well as others inherent therein. While presently preferred embodiments of the invention have been given for the purpose of disclosure, numerous changes in the steps of the process and use of the process may be made which will readily suggest themselves to those skilled in the art and which are encompassed within the spirit of the invention and the scope of the appended claims.

We claim:

1. The method of making carbon black which includes continuously establishing a mixture of fuel gas and combustion air within a substantially unobstructed cylindrical first zone; igniting said mixture while in said first zone; passing the burning mixture into a second zone comprising an elongated tube in axial alignment and open communication with said first zone; injecting carbon black producing feedstock by sonic energy waves into said second zone and into the ignited mixture therein; pyrolytically dissociating said feedstock to produce carbon black aerosol; and cooling the effluent and recovering the carbon black therefrom.

2. The method of making carbon black which includes continuously establishing a mixture of fuel gas and combustion air within a substantially unobstructed cylindrical first zone; igniting said mixture while in said first zone; passing the burning mixture into a second zone comprising an elongated tube in axial alignment and open communication with said first zone; injecting carbon black producing feedstock by sonic energy waves into said second zone and into the ignited mixture therein; pyrolytically dissociating said feedstock to produce carbon black aerosol while initially directing the air for combustion upstream with respect to said elongated tube and in peripheral contact therewith; and cooling the effluent and recovering the carbon black therefrom.

3. The method of making carbon black which includes continuously establishing a mixture of fuel gas and combustion air within a substantially unobstructed cylindrical first zone; igniting said mixture while in said first zone; passing the burning mixture into a second zone comprising an elongated metallic fin tube in axial alignment and open communication with said first zone; injecting carbon black producing feedstock by sonic energy waves into said second zone and into the ignited mixture therein; pyrolytically dissociating said feedstock to produce carbon black aerosol while initially directing said combustion air into an annulus surrounding said fin tube in heat exchange relationship to said aerosol and in a general countercurrent direction with respect to the direction of flow of said aerosol; and cooling the effluent and recovering the carbon black therefrom.

4. The method of making carbon black which includes continuously establishing a mixture of fuel gas and combustion air within a substantially unobstructed cylindrical first zone by injecting a fuel gas into preheated air in said first zone; igniting said mixture while in said first zone; passing the burning mixture into a second zone comprising an elongated metallic fin tube in axial alignment and open communication with said first zone; injecting carbon black producing feedstock by sonic energy waves into said second zone and into the ignited mixture therein; pyrolytically dissociating said feedstock to produce carbon black aerosol while initially directing said combustion air into an annulus surrounding said fin tube in heat exchange relationship to said aerosol and in a general countercurrent direction with respect to the direction of flow of said aerosol; and cooling the effluent and recovering the carbon black therefrom.

5. Apparatus for making carbon black comprising means for continuously establishing a mixture of fuel gas and combustion air within a substantially unobstructed cylindrical first zone; means for igniting said mixture while in said first zone; means for passing the burning mixture into a second zone in axial alignment and open communication with said first zone; means for injecting carbon black producing feedstock by sonic energy waves into said second zone and into the ignited mixture therein; means for pyrolytically dissociating said feedstock to produce carbon black aerosol; and means for cooling the effluent and recovering the carbon black therefrom.

6. The apparatus of claim 5 wherein the means for injecting carbon black producing feedstock comprises a hollow body member terminating in a choked nozzle; a hollow stem having an axial bore positioned partially within said body and having a portion extending through said nozzle; a resonator cup supported by said extending stem portion in spaced opposition to said nozzle; an end member carried by said stem and extending downstream from said resonator cup and provided with a plurality of radial apertures communicating with said axial bore and terminating in spray orifices; means for connecting said hollow stem with a source of liquid carbon black feedstock oil; and means for introducing a supply of gas into the interior of said body for expulsion through said nozzle.

7. An apparatus for producing carbon black which comprises an elongate tubular reactor disposed within and axially of said elongate metallic tubular housing and providing an air jacket therebetween; one end of said elongate metallic tubular housing extending beyond the corresponding end of said elongate tubular reactor and providing an unobstructed chamber therein; a closure member for the aforementioned end of said elongate metallic tubular housing and communicating with said air jacket; an air inlet disposed adjacent the other end of said elongate tubular housing and communicating with said air jacket; a gas burner disposed in said unobstructed chamber and in axial alignment with said elongate tubular reactor; and a sonic spray nozzle for supplying liquid carbon black feedstock to the flame produced by said gas burner.

8. The apparatus of claim 7 wherein said sonic spray nozzle is disposed in axial alignment with said elongate tubular reactor.

9. An apparatus for producing carbon black which comprises an elongate tubular housing, an elongate tubular reactor disposed within and axially of said elongate metallic tubular housing and providing an air jacket therebetween; one end of said elongate metallic tubular housing extending beyond the corresponding end of said elongate tubular reactor and providing an unobstructed chamber therein; a closure member for the aforementioned end of said elongate metallic tubular housing and communicating with said air jacket; an air inlet disposed adjacent the other end of said elongate tubular housing and communicating with said air jacket; a gas burner disposed in said unobstructed chamber and in axial alignment with said elongate tubular reactor, a sonic spray nozzle for supplying liquid carbon black feedstock to the flame produced by said gas burner; and a flared extension on the upstream end of said elongate metallic tubular reactor and in axial alignment with said gas burner, said flared extension being provided with a series of louvers for receiving air from said air jacket.

10. The apparatus of claim 9 wherein said sonic spray nozzle is disposed in axial alignment with said elongate tubular reactor.

11. An apparatus for producing carbon black which comprises an elongate tubular housing, an elongate tubular reactor disposed within and axially of said elongate metallic tubular housing and providing an air jacket therebetween; one end of said elongate metallic tubular housing extending beyond the corresponding end of said elongate tubular reactor and providing an unobstructed chamber therein; a closure member for the aforementioned end of said elongate metallic tubular housing and communicating with said air jacket; an air inlet disposed adjacent the other end of said elongate tubular housing and communicating with said air jacket; a gas burner disposed in said unobstructed chamber and in axial alignment with said elongate tubular reactor, a sonic spray nozzle for supplying liquid carbon black feedstock to the flame produced by said gas burner; and a series of heat-transfer fins on the outer surface of said elongate tubular reactor, said heat-transfer fins being adapted to guide the air from said air inlet toward the upstream end of said elongate tubular reactor.

12. The apparatus of claim 11 wherein said sonic spray nozzle is disposed in axial alignment with said elongate tubular reactor.

13. An apparatus for producing carbon black which comprises an elongate tubular housing; an elongate tubular reactor disposed within and axially of said elongate metallic tubular housing and providing an air jacket therebetween; one end of said elongate metallic tubular housing extending beyond the corresponding end of said elongate tubular reactor and providing an unobstructed chamber therein; a closure member for the aforementioned end of said elongate metallic tublar housing and communicating with said air jacket; an air inlet disposed adjacent the other end of said elongate tubular housing and communicating with said air jacket; a gas burner disposed in said unobstructed chamber and in axial alignment with said elongate tubular reactor; a sonic spray nozzle for supplying liquid carbon black feedstock to the flame produced by said gas burner; a flared extension on the upstream end of said elongate metallic tubular reactor and in axial alignment with said gas burner; said flared extension being provided with a series of louvers for receiving air from said air jacket; and a series of heat-transfer fins on the outer surface of said elongate metallic tubular reactor; said heat-transfer fins being adapted to guide the air from said air inlet toward the upstream end of said elongate tubular reactor.

14. The apparatus of claim 13 wherein said sonic spray nozzle is disposed in axial alignment with said elongate tubular reactor.

15. An apparatus for producing carbon black which comprises an elongate tubular housing; an elongate tubular reactor disposed within and axially of said elongate metallic tubular housing and providing an air jacket therebetween; one end of said elongate metallic tubular housing extending beyond the corresponding end of said elongate tubular reactor and providing an unobstructed chamber therein; a closure member for the aforementioned end of said elongate metallic tubular housing and communicating with said air jacket; an air inlet disposed adjacent the other end of said elongate tubular housing and communicating with said air jacket; a gas burner disposed in said unobstructed chamber and in axial alignment with said elongate tubular reactor; a sonic spray nozzle for supplying liquid carbon black feedstock to the flame produced by said gas burner; a flared extension on the upstream end of said elongate tubular reactor and in axial alignment with said gas burner; said flared extension being provided with a series of louvers for receiving air from said air jacket; and a series of heat-transfer fins on the outer surface of said elongate metallic tubular reactor; said heat-transfer fins being adapted to guide the air from said air inlet toward the upstream end of said elongate tubular reactor; said sonic spray nozzle generator including a hollow body member terminating in a choked nozzle; a hollow stem having an axial bore positioned partially within said body and having a portion extending through said nozzle; a resonator cup supported by said extending stem portion in spaced opposition to said nozzle; an end member carried by said stem and extending downstream from said resonator cup and provided with a plurality of radial apertures communicating with said axial bore and terminating in spray orifices; means for connecting said device to a source of liquid carbon black feedstock oil; and means for introducing a supply of gas into the interior of said body for expulsion through said nozzle.

References Cited

UNITED STATES PATENTS

| | | | |
|---|---|---|---|
| 2,934,410 | 4/1960 | Smith | 23—277 |
| 3,087,796 | 4/1963 | Latham, et al. | 23—259.5 |
| 3,157,359 | 11/1964 | Fortman | 239—102 |

JOSEPH SCOVRONEK, *Primary Examiner.*

JAMES H. TAYMAN, JR., *Examiner.*